United States Patent Office 3,236,820
Patented Feb. 22, 1966

3,236,820
PROCESS FOR WATER-SOLUBLE SULFONIUM POLYMERS
William G. Lloyd, Bay City, Mich., assignor to The Dow Chemical Company, Midland, Mich., a corporation of Delaware
No Drawing. Filed Apr. 3, 1961, Ser. No. 99,979
1 Claim. (Cl. 260—79.3)

This invention concerns new water-soluble, high molecular weight polymeric sulfonium halide resins having a preponderance of combined vinylbenzyl sulfonium salt units. It also concerns the preparation of such polymeric products by reacting a vinylbenzyl halide polymer, either (1) linear or (2) branched or crosslinked with about 0.01 to 1 weight percent of a crosslinking agent, vinylbenzyl halide basis, with an organic sulfide.

In U.S. Patent 3,072,588 filed October 13, 1958, a method for making high molecular weight linear and lightly crosslinked vinylbenzyl chloride polymers is disclosed. The method concerns emulsion polymerizing an oil-in-water emulsion containing up to about 50 weight percent of vinylbenzyl chloride and up to one weight percent divinylbenzene, vinylbenzyl chloride basis, in the presence of about 0.1 to 1 weight percent of a peroxy initiator, water basis, an equivalent weight of a water-soluble reducing activator, initiator basis, and up to about 10 weight percent of a water-in-oil emulsifying agent, water basis, the balance being water, advantageously at between 0° and 30° C. for about 2 to 60 hours. The polymeric product thereby obtained as an aqueous latex has a polymer particle diameter ranging from about 300 A. to about 3000 A., and a molecular weight of about 15 million to about 15 billion for the crosslinked polymers, based on the mass of the latex particle, as calculated from the electron micrograph diameter, its density and the assumption that there is only one molecule per latex particle in the presence of appreciable crosslinking agent. That assumption is supported by the viscosity behavior of dilute solutions of the microgel. The linear polymers have a molecular weight of about 0.2 million to 2 million calculated from the intrinsic viscosities of the parent poly(vinylbenzyl chloride) latexes, using the styrene constants cited in Boundy and Boyer, Styrene, 1952, page 336 and interpolating by the standard chain-transfer equation (Flory, Principles of Polymer Chemistry, 1953, page 141). The branched polymers having combined divinylaryl crosslinking agent in amount up to 0.04 weight percent have a molecular weight ranging between ca. 2 million and 15 million. When recovered as a dry solid by spray drying in an inert atmosphere or by freeze coagulating, water washing, washing with methanol and drying at a low temperature in an inert atmosphere, the product is less stable and gradually becomes non-dispersible in organic solvents, rapidly so if exposed to air.

It has now been discovered that a water-soluble high molecular weight sulfonium halide resin can be prepared by reacting the above-mentioned vinylbenzyl chloride polymers, most advantageously as an aqueous latex, with a substantially stoichiometric proportion, benzylic halide basis, of an organic sulfide of the dialkyl, polymethylene, di(hydroxyalkyl) or alkyl hydroxyalkyl type at a temperature between about 20° and 70° C. The products are water-soluble, high molecular weight vinylbenzyl sulfonium halide polymers. By "water-soluble" is meant a time-stable, visually homogeneous solution in water. The organic sulfides used in the reaction have alkyl groups containing up to 4 carbon atoms, polymethylene groups containing up to 5 carbon atoms and hydroxyalkyl groups containing from 2 to 4 carbon atoms, respectively.

While reaction involves substantially stoichiometric proportions (from 0.9 to 1.1 mole of sulfide per side chain chloride), it is preferred to use an excess of sulfide reactant, advantageously up to about twice that of theory. Since the sulfide can be recovered, the amount of its excess is immaterial. Water, lower monohydric alcohols having up to 4 carbon atoms, glycols having up to 4 carbon atoms, and aqueous solutions of such alcohols and glycols dissolve the product resin and are useful reaction media. A reaction temperature of 20° to 70° C. is used, depending upon the volatility of the sulfide. Below 20° C., the reaction rate is uneconomic, while above 70° C., benzylic chloride is subject to hydrolysis.

The following equation, in terms of polymer units, is typical of the reaction involved:

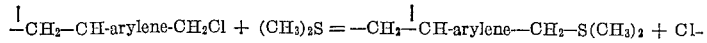

The products of this invention have a substitution of ca. 65%–98% of sulfonium groups based on halomethyl groups originally present.

The method of this invention thus applies a chemical reaction not previously used with a high polymer. Styrene-type microgels have never before been rendered truly water soluble by a chemical modification of this type.

The products of this invention, consisting of linear, branched and microgel polymers ranging in molecular weight from about 0.2 million to 15 billion, are useful as aqueous gelation agents at a concentration as low as 0.7%, and are effective thickeners at concentrations as low as 0.1%. The products of this invention are unusually effective flocculants. They are also useful intermediates for the preparation of a wide variety of other derived polymers.

The following examples show ways in which the invention has been practiced.

EXAMPLE 1

A quantity of 10 ml. of aqueous polymeric ar-vinylbenzyl chloride latex (0.05 weight percent combined divinylbenzene, M.W. about 60 million, 25.8% polymer solids) was diluted with 100 ml. distilled water in a citrate bottle, 10 ml. of dimethyl sulfide was added and the bottle was capped and allowed to stand at room temperature for 72 hours. At the end of this time, the excess dimethyl sulfide was removed at room temperature and reduced pressure, leaving a clear, homogeneous syrupy solution of poly(dimethyl((ar-vinylbenzyl))sulfonium chloride). An aqueous one weight percent solution of the sulfonium polymer had a specific viscosity or 55 at 25° C. Even in highly dilute aqueous solutions, the sulfonium microgel solutes remain uniformly dispersed, with no detectable sedimentation or coagulation into gel particles. A portion of the syrup was carefully diluted with distilled water to give a solution of 0.05 weight percent poly(dimethyl((ar - vinylbenzyl))sulfonium chloride). A reference solution of 0.05 weight percent polyacrylamide in water was also prepared. Three 100 ml. stoppered graduated cylinders were charged with 100 ml. portions of distilled water containing a suspension of one weight percent of Peabody coal fines. Cylinder 1 was designated the control. To cylinder 2 was added 3 drops, about 9.15 ml., of 0.05% polyacrylamide solution with gentle shaking. To cylinder 3 was added simultaneously 3 drops, about 0.15 ml., of the 0.05% sulfonium salt solution with identical shaking. The three cylinders were gently rocked for 3 cycles, then placed upright to settle. At the end of 100 seconds, cylinders 1 and 2 showed no change in appearance, while in cylinder 3 the solids had coagulated and settled to a volume of 14.2 ml., leaving a substantially clear supernatant. At the end of 2,000 seconds, the solids in cylinders 1 and 2 had very slightly settled to volumes of about 95 ml., leaving turbid supernatants of about 5 ml., while in cylinder 3 the solids had settled to a volume of 6.8 ml., leaving a clear supernatant. Addition of as much as 2.0 ml. excess of the sulfonium salt solution merely led to very fast coagulation, with no sign of redispersion as is characteristic of some ionic flocculants.

EXAMPLE 2

One and one-fourth g. of poly(ar-vinylbenzyl) chloride microgel powder containing 0.125% combined divinylbenzene was mixed with 50 ml. water and 10 ml. dimethyl sulfide. The mixture was allowed to stand covered at 25° to 28° C. for 40 hours. A homogeneous gel was obtained. Successive dilutions with water yielded gels having solids contents as low as 0.70% as sulfonium salt polymer, and yielded substantially thickened aqueous solutions having solids contents as low as 0.11% as sulfonium salt polymer.

EXAMPLE 3

A quantity of 1.25 g. of freeze-coagulated poly(ar-vinylbenzyl chloride) microgel containing 0.125% combined divinylbenzene, 50 ml. water (Preparation I) and 10 ml. dimethyl sulfide was allowed to stand at 25.6° C. for 40 hours in a stoppered Erlenmeyer flask with occasional shaking. The procedure was repeated, substituting in place of the 50 ml. of water 50 ml. methanol (Preparation II) and 50 ml. isopropanol (Preparation III). Preparations I and II gave a clear gel which diluted smoothly with water. Preparation III gave a white powder which gelled and diluted smoothly with water.

EXAMPLE 4

To 0.080 g.-equiv. of poly(ar-vinylbenzyl chloride) microgel (0.05% divinylbenzene) was added 0.088 mole dimethyl sulfide, 42.95 g. isopropanol, and water to make up to 171.8 g. This mixture was placed in a citrate of magnesia bottle, capped, and the bottle placed in a tumbler bath thermostated at 70° C. In three hours, a water-clear, colorless, viscous solution of poly(vinylbenzyl dimethylsulfonium chloride) microgel was obtained as a 10% solution also containing 25 weight percent of isopropanol.

EXAMPLE 5

To 20 g. of poly(ar-vinylbenzyl chloride) aqueous latex (0.05% divinylbenzene, 0.0366 g.-equiv. of reactant polymer) was added 0.0433 mole tetrahydrothiophene, 18.3 g. isopropanol and 31.1 g. water. This mixture was placed in a capped bottle on a shaker at room temperature for 60 hours, whereupon a clear, water-white, viscous solution was obtained, containing the poly(tetrahydro-1-((ar-vinylbenzyl))thiophenium chloride) microgel polymer.

EXAMPLE 6

To 5.0 g. of poly(ar-vinylbenzyl chloride) aqueous latex (0.05% divinylbenzene, 28% polymer solids) and 39.2 g. water was added 1.8 g. diethyl sulfide. The mixture contained in a capped bottle was placed on a shaker for 24 hours, then allowed to stand at room temperature for a week, whereupon a transparent colorless gel of poly(diethyl((ar-vinylbenzyl))sulfonium chloride) microgel was obtained.

EXAMPLE 7

A quantity of 50 ml. of a 10% solution of poly-(dimethyl((ar - vinylbenzyl))sulfonium chloride) microgel, (0.05% divinylbenzene, prepared according to Example 4) was mixed in a citrate bottle with 50 ml. water and 50 ml. of 2,2′-thiobisethanol, the bottle being capped and placed in a tumbler bath at 50° C. for 66 hours. The bottle was then opened and the displaced dimethyl sulfide permitted to escape. The clear, viscous solution consisted of poly(bis(2-hydroxyethyl)((ar-vinylbenzyl))sulfonium chloride) microgel, along with excess 2,2′-thiobisethanol. This water-soluble microgel, containing two alcoholic groups per monomer unit, is characterized by its solubility in aqueous-alcoholic solutions. This microgel is soluble in 65% isopropanol-35% water whereas the dimethyl analog microgel is precipitated even by 35% isopropanol-65% water.

EXAMPLE 8

To a solution of 10 g. dimethyl sulfide diluted to 50 ml. with ethylene glycol was added a diluted latex prepared by adding 10 g. of poly(ar-vinylbenzyl chloride) microgel latex (29% polymer solids) to 40 ml. ethylene glycol. The mixture, contained in a capped bottle, was shaken and allowed to stand 60 hours at room temperature. A water-clear, colorless solution of poly-(dimethyl((ar-vinylbenzyl))sulfonium chloride) microgel was obtained.

EXAMPLE 9

A series of linear polyvinylbenzyl chloride aqueous latexes was prepared, using the 30° C. emulsion polymerization procedure described above. To the vinylbenzyl chloride monomer was added various small amounts of tert-dodecyl mercaptan, a chain-transfer agent, to shorten the polymer chain length. The reaction mixtures were prepared as follows:

Table I

| Reaction mixtures: | Mls. |
|---|---|
| Polyvinylbenzyl chloride aqueous latex (26.6% solids) | 200 |
| Deionized water | 500 |
| Isopropyl alcohol | 200 |
| Dimethyl sulfide, redistilled | 28.3 |

The mixtures were shaken thoroughly, then allowed to stand at room temperature for 100 hours, whereupon the opaque suspensions were found to have become clear, water-white, viscous solutions of poly(dimethyl((ar-vinylbenzyl))sulfonium chloride), soluble and dilutable with water in all proportions.

The monomer-mercaptan proportions used, and the molecular weights of the resulting sulfonium polymers, are as follows:

Table II

| Monomer, Percent | Mercaptan, Percent | Product Molecular Weight [1] |
|---|---|---|
| 100.00 | Nil | $1.78 \times 10^6$ |
| 99.999 | 0.001 | |
| 99.997 | 0.003 | |
| 99.99 | 0.010 | $1.38 \times 10^6$ |
| 99.97 | 0.030 | |
| 99.90 | 0.10 | $4.56 \times 10^5$ |
| 99.70 | 0.30 | $1.83 \times 10^5$ |

[1] Calculated by the procedure indicated above.

EXAMPLE 10

A series of five poly(ar-vinylbenzyl chloride) aqueous latexes was prepared by the procedure described above, with the following amounts of divinylbenzene cross-linker or tert-dodecyl mercaptan present.

Table III

| Run | Percent Divinyl benzene | Percent Dodecyl mercaptan |
|---|---|---|
| A | Nil | Nil |
| B | 0.03 | Nil |
| C | 0.06 | Nil |
| D | Nil | 0.03 |
| E | Nil | 0.06 |

Reaction mixtures were then prepared as follows. To each 200 ml. of aqueous latex (=57.80 g. polymer) was added 1403.6 ml. deionized water and 25.88 g. redistilled dimethylsulfide and the mixtures were placed upon roller-mixers at room temperature. After six days, the reaction mixtures, initially fluid and opaque, had transformed into transparent gels of poly(dimethyl((ar-vinylbenzyl))sulfonium chloride); Run E was a clear, viscous fluid. To each reaction mixture was added 407.4 g. isopropyl alcohol, and the mixture returned to the roller for 16 hours, whereupon in all cases the reaction products were thinned to clear fluid solutions, readily soluble in water in all proportions.

EXAMPLE 11

Poly(ar-vinylbenzyl chloride) aqueous latex (419.6 g. of the aqueous suspension=100.0 g. polymer), prepared with neither crosslinking nor chain-transfer agents by the procedure described above, was diluted to 1000 ml. with water. Dimethyl sulfide (44.78 g.=110% of theoretical amount) was diluted with 1000 ml. of water and 500 ml. of isopropyl alcohol, and the solutions combined in a one-gallon bottle, to give a mixture containing initially 4.00 g./100 ml. of polyvinylbenzyl chloride. After 63 hours on the roller-mixer at room temperature, the initially fluid and opaque mixture was transformed to a clear, viscous syrup containing about 5.6% of poly(dimethyl((ar-vinylbenzyl))sulfonium chloride), the viscosity molecular weight of which was estimated to be 1.8 million. The polymer solution was smoothly dilutable with water in all proportions. Clear dilute solutions of 0.01% polymer in water were stable and homogeneous.

This application is a continuation-in-part of U.S. patent application, Serial No. 738,939, filed June 2, 1958, now abandoned.

What is claimed is:

A method for making a water-soluble, high molecular weight sulfonium product by reacting an aqueous latex of a polymeric vinylbenzyl halide resin having from 0.00 to 1 weight percent of a combined divinylaryl crosslinking agent and having a resin particle diameter ranging from about 300 A. to about 3,000 A. and a molecular weight of about 0.2 million to 15 billion with a substantially stoichiometric proportion of an organic sulfide of the group consisting of dialkyl sulfides, di(hydroxyalkyl) sulfides, polymethylene sulfides and alkyl hydroxyalkyl sulfides wherein the alkyl groups contain 1 to 4 carbon atoms, the polymethylene groups contain up to 5 carbon atoms and the hydroxyalkyl radicals contain from 2 to 4 carbon atoms, at a temperature between 20° and 70° C. for a time sufficient to introduce sulfonium groups on 65% to 98% of the aromatic nuclei to yield a water-soluble high molecular weight polyvinylbenzyl sulfonium resin product.

References Cited by the Examiner

UNITED STATES PATENTS

| 2,800,747 | 7/1957 | Pitt | 47—58 |
| 2,895,925 | 7/1959 | Hwa | 260—79 |
| 3,078,259 | 2/1963 | Hatch et al. | 260—79.7 |
| 3,130,117 | 4/1964 | Humiston et al. | 260—79.7 |

OTHER REFERENCES

Boundy et al.: Styrene, Its Polymers, Copolymer and Derivatives, 1952, pages 719–726, Reinhold Publishing Corp.

JOSEPH L. SCHOFER, *Primary Examiner.*

H. N. BURSTEIN, WILLIAM SHORT, *Examiners.*